US005443383A

United States Patent [19]

Kuehn

[11] Patent Number: 5,443,383

[45] Date of Patent: Aug. 22, 1995

[54] PUSHER TYPE FURNACE FOR HEAT-TREATING CHARGES

[75] Inventor: Friedhelm Kuehn, Muelheim, Germany

[73] Assignee: Loi Industrieofenanlagen GmbH, Essen, Germany

[21] Appl. No.: 331,334

[22] Filed: Oct. 28, 1994

Related U.S. Application Data

[63] Continuation of Ser. No. 218,999, Mar. 29, 1994, abandoned, which is a continuation of Ser. No. 51,002, Apr. 20, 1993, abandoned, which is a continuation of Ser. No. 783,840, Oct. 29, 1991, abandoned.

[30] Foreign Application Priority Data

Oct. 31, 1990 [DE] Germany ........................ 40 34 653.6

[51] Int. Cl.[6] .......................... C21D 1/18; F27B 9/28; B65G 47/26

[52] U.S. Cl. ................................... 432/122; 432/128; 432/234

[58] Field of Search ............... 432/126, 127, 128, 133, 432/234

[56] References Cited

U.S. PATENT DOCUMENTS 3,982,887 9/1976 Kendziora et al. ................ 432/128
4,205,935 6/1980 Edler et al. ......................... 432/122
4,397,451 8/1983 Kinoshita et al. ................... 432/128
4,586,898 5/1986 Orbeck ............................... 432/128
4,627,814 12/1986 Hattori et al. ...................... 432/128
4,932,864 6/1990 Miyabe ............................... 432/128
4,966,547 10/1990 Okuyama et al. .................. 432/128

*Primary Examiner*—Tony M. Argenbright
*Attorney, Agent, or Firm*—Blakely, Sokoloff, Taylor & Zafman

[57] ABSTRACT

The pusher type furnace comprises an entry chamber (2) associated with a charging device (30) to transfer charge holding devices (a through q) carrying the charges to be heat-treated. The entry chamber is followed by a rectilinear heat treatment chamber (3) and the latter by an exit chamber (4). The entry chamber and the exit chamber may each be separated from the heat treatment chamber by means of doors (15, 16). A pusher device (5) operating in a cyclic mode pushes all charge holding devices in each cycle forward by the length of one charge holding device in the direction of charge travel (X). For separate temperature and atmosphere control in subsequent sections (8, 9 and 10) of the heat treatment chamber (3), two doors (11, 12) are provided. The row of charge holding devices (a through p) is separated into several sets of charge holding devices (31, 32, 33) by means of mobile skid sections (71, 73) moving a downstream set of charge holding devices (31) and an upstream set of charge holding devices (33) away from a central set of charge holding devices (32) to create gaps (34, 35) for the two doors (11 and 12) to close.

32 Claims, 6 Drawing Sheets

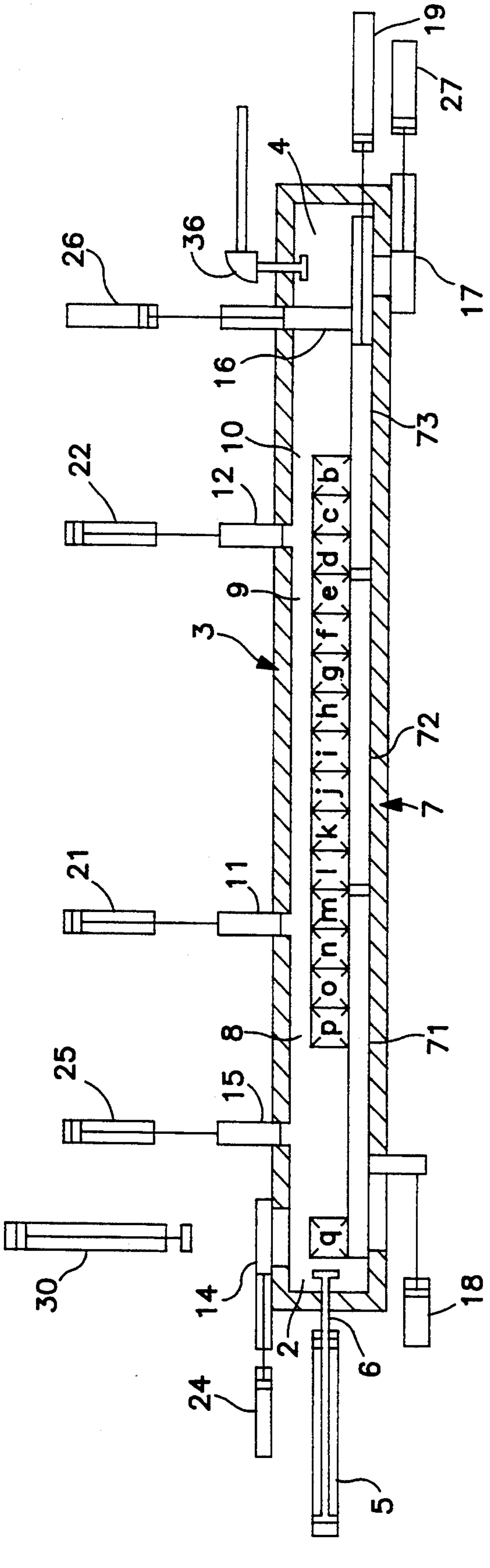
FIG. ID

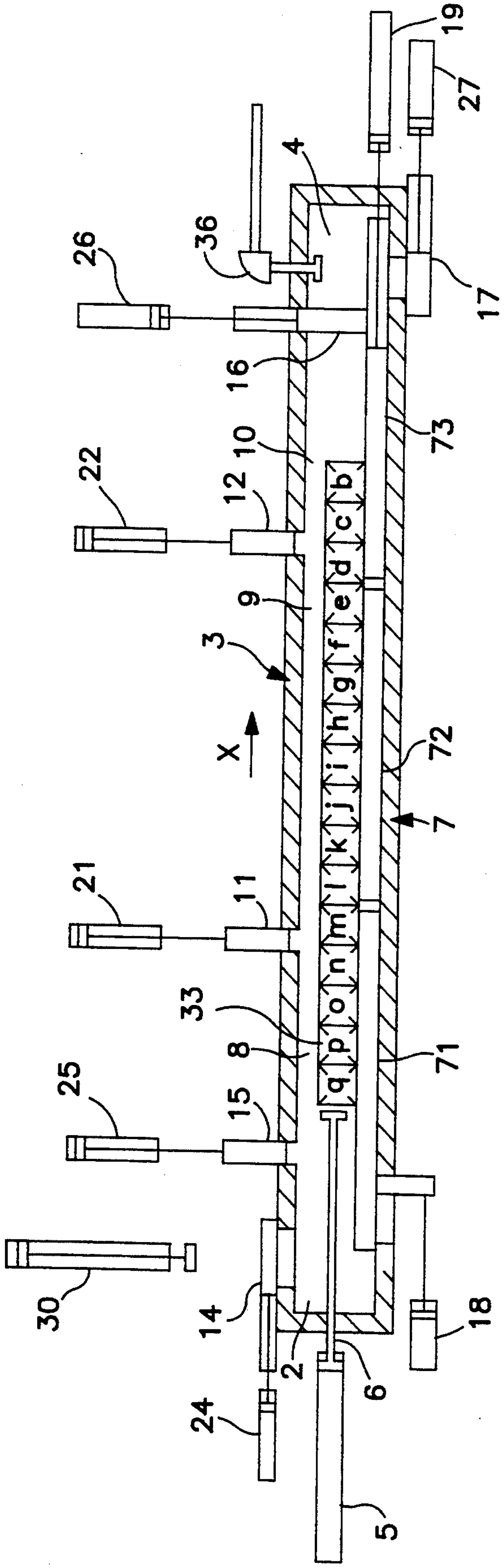
FIG. IE

PUSHER TYPE FURNACE FOR HEAT-TREATING CHARGES

This is a continuation of application Ser. No. 08/218,999 filed on Mar. 29, 94 which is a continuation of application Ser. No. 08/051,002 filed Apr. 20, 1993 which is a continuation of application Ser. No. 07/783,840 filed Oct. 29, 1991, all now abandoned.

BACKGROUND OF THE INVENTION

1. Field of the Invention

The present invention relates to the heat treatment of charges in a furnace and more particularly, the separation of charge holding devices being arranged in a row and being pushed in cyclic intervals through said furnace.

2. Prior Art

The operator of a heat treatment furnace often prefers to carry out a multi-stage heat treatment process in one and the same treatment chamber. In a process such as carburizing the charge is heated in a first stage, passes thereupon through a carburizing and diffusion treatment and is finally hardened. In said first heating stage, an atmosphere which does not produce sooting due to the relatively low temperature of the charge is desirable. In the carburization and diffusion zones of the furnace on the other hand, the carbon concentration of the furnace atmosphere should be at the maximum allowable level. In the hardening zone finally the charge is cooled und said cooling operation should preferably not be disturbed by heat transfer from the carburizing and the diffusion zones to the zone in which the charge is so cooled. Said zones are preferably isolated from each other. In the case of roller hearth furnaces of the type divulged, for example, in EP 0168788 each such heat treatment zone is provided with its own roller drive allowing the selective operation of the rollers in each such zone. With such an arrangement, the charges held in two adjacent zones may be moved relative to each other through selective roller drive operation and may be separated from each other by a door closing between two such zones. However, when compared with pusher type furnaces, roller hearth furnaces are associated with a number of drawbacks and disadvantages. If, for example, the rollers in such a furnace are exposed to a permanent load for a certain period of time they will tend to bend because of the relatively high temperature in the furnace chamber and must then be reversed and moved forward to prevent such bending. Further the cost of rollers and roller drives and the maintenance expense associated with rollers and roller drives are particularly high.

In the case of pusher type furnaces the separation of charge holding devices in the furnace chamber poses certain difficulties. If zones in the furnace are to be separated by doors then according to the state of the art, the direction of charge travel must be changed in conventional pusher type furnaces at the point of transition from one zone to the next following zone by the charge continuing its travel in the latter one of the two adjacent zones at a right angle to the direction of charge travel in the upstream zone. Furnaces in which the direction of charge travel is so changed require a relatively large space for installation.

The space required across the direction of charge travel is substantially smaller in the case of pusher type furnaces arranged in a line but prior art did not allow the isolation of furnace zones by doors. Known pusher type furnaces were therefore designed with a reduced cross section at the points of transition between adjacent furnace zones just allowing the charge to pass, but interference between two such adjacent zones had to be accepted.

THE INVENTION

It is the object of the present invention to combine rectilinear charge holding device transfer through a pusher type furnace with an arrangement for the selective isolation of heat treatment zones by doors.

The pusher type furnace proposed by the present invention has an entry chamber with a facility for charging devices which hold the charges to be heat-treated. Said entry chamber is followed by a rectilinear treatment chamber and the latter by an exit chamber. Said entry chamber and said exit chamber may be isolated by doors from said treatment chamber. A pushing device operating in a cyclic mode pushes during the pushing part of each cycle all holding devices forward by one station in the direction of charge travel. For separate temperature and atmosphere control in adjacent zones of said treatment chamber, said treatment chamber is provided with two doors. Movable skid sections are provided to separate the row of charge holding devices into several sets of charge holding devices with gaps between each two such sets, said movable skid section moving a set of charge holding devices facing the exit end of the heat treatment chamber and a set of charge holding devices facing the entry end of said heat treatment chamber away from a central set of charge holding devices, thereby creating gaps for the two heat treatment chamber doors to close.

In the method proposed by the present invention, a row of charge holding devices is separated at the end of each pushing part of each furnace cycle into at least two sets of charge holding devices, at least one gap being created between said sets. Each such gap is created by moving a set of charge holding devices facing the entry end of the heat treatment chamber in a direction opposite to the direction of charge travel and a set of charge holding devices facing the exit end of said heat treatment chamber in the direction of charge travel relative to the adjacent set of charge holding devices, a door separating said heat treatment chamber into adjacent zones closing across each such gap. Each such adjacent sets of charge holding devices are joined again prior to the commencement of the pushing part of the next following furnace cycle after the door has opened.

The actual pushing operation is in the case of the method proposed by the present invention in no way different from the conventional pushing operation. At least one new charge holding device is added to the uninterrupted row of charge holding devices and said uninterrupted row of charge holding devices is thereupon pushed forward in a rectilinear fashion by one station. Following said pushing operation, said row of charge holding devices is separated into sets, with at least one charge holding device being carrying a charge having undergone full heat treatment provided that the heat treatment cycle has been completed for said charge being discharged, and the heat treatment zones are thereafter isolated from each other by door closing. Following the heat treatment part of the furnace cycle, the next following pushing part will only commence after the sets of charge holding devices have again been moved together to form one uninterrupted row of charge holding devices.

The present invention hence combines the advantages of rectilinear charge transfer by pusher and the advantages of heat treatment zones isolated from each other selectively by doors.

According to the teachings of the present invention, the heat treatment chamber may consist of two zones only. To create a gap in the uninterrupted row of charge holding devices, a set of charge holding devices facing the chamber entry end is displaced in a direction opposite to the direction of charge travel or alternatively a set of charge holding devices facing the exit end of the heat treatment chamber is moved forward in the direction of charge travel. It is also possible to move the two sets of charge holding devices simultaneously by correspondingly shorter distances in opposite directions.

The present invention also foresees the separation of the row of charge holding devices into several sets of charge holding devices facing the entry end of the furnace and/or several sets of charge holding devices facing the exit end of the heat treatment furnace.

In a preferred embodiment of the present invention, a central set of charge holding devices remains stationary while the row of charge holding devices is being separated into sets. Said stationary set may also interact with several sets of charge holding devices facing the entry end of the furnace and/or several sets of charge holding devices facing the exit end of the furnace but in the simplest configuration which is most relevant for practical applications the row of charge holding devices is separated into three sets, the two outer sets being moved away from the stationary central set, thereby allowing the provision of a heat treatment chamber separated into three zones of the type particularly fit for carburization.

In a preferred embodiment of the present invention, the set of charge holding devices facing the exit end of the furnace is, when the adjacent upstream door is closed, temporarily moved forward in the direction of charge travel by a further distance allowing the transfer of the charge holding device to be discharged into an exit chamber serving as a vestibule. The other charge holding devices of said set are thereafter returned to a position within the appropriate heat treatment zone. Following the closing of the vestibule door separating the heat treatment chamber from said exit chamber, the last heat treatment zone in the heat treatment chamber of the furnace is fully isolated and the charge holding device with the heat-treated charge in the vestibule may be discharged from the furnace.

BRIEF DESCRIPTION OF THE DRAWINGS

A preferred embodiment of the present invention will now be described by way of example with reference to the accompanying drawing in which:

FIG. 1 1A through 1F are schematic axial views of an embodiment of a pusher type furnace in accordance with the teachings of the present invention showing six different parts of a furnace cycle, the presentation of furnace components being limited to schematic representations of importance for the present invention and its understanding; and FIG. 2 is a partial view of an embodiment of a gear type coupling of several drives.

DETAILED DESCRIPTION OF THE INVENTION

Figure 1A:
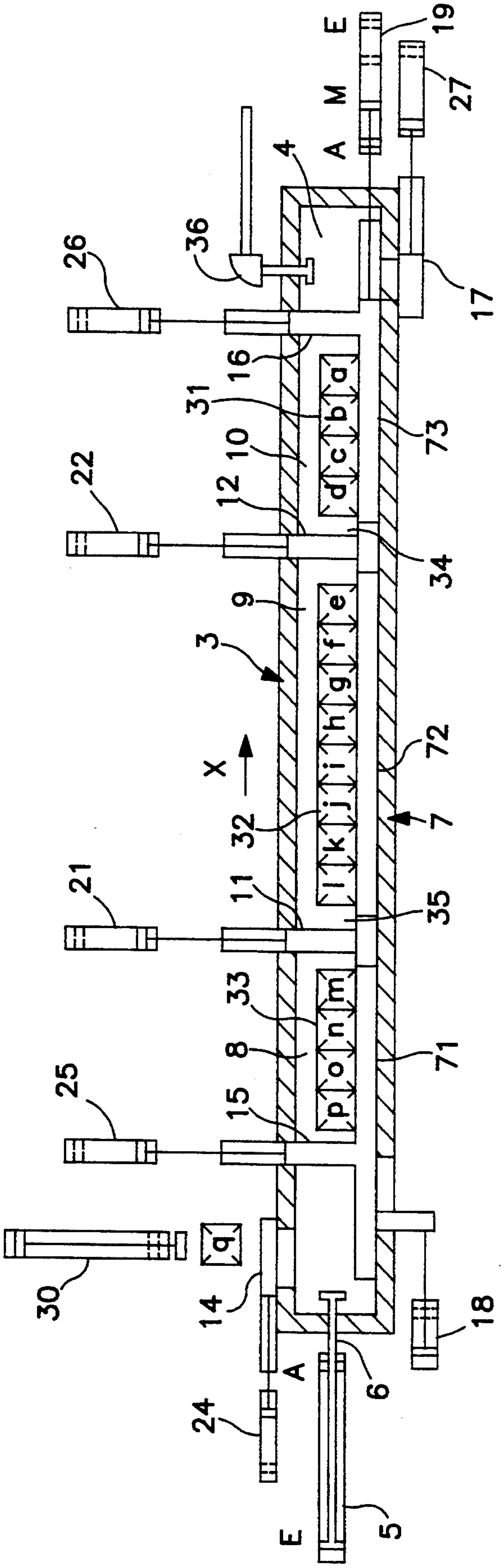
Figure 1B:
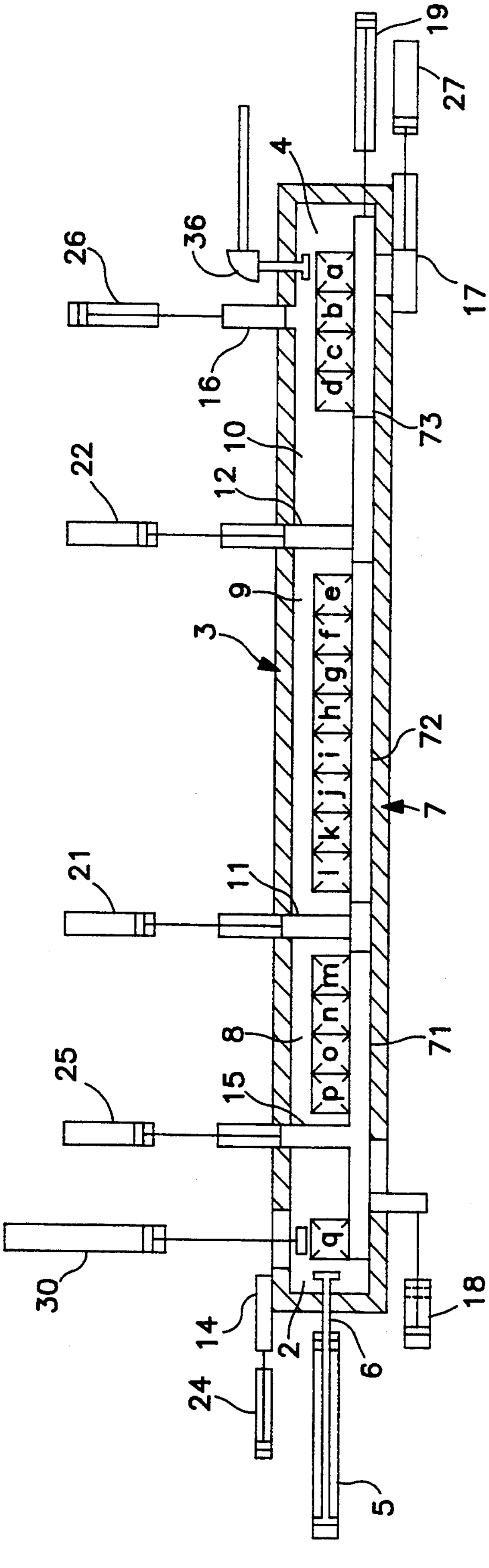
Figure 1C:
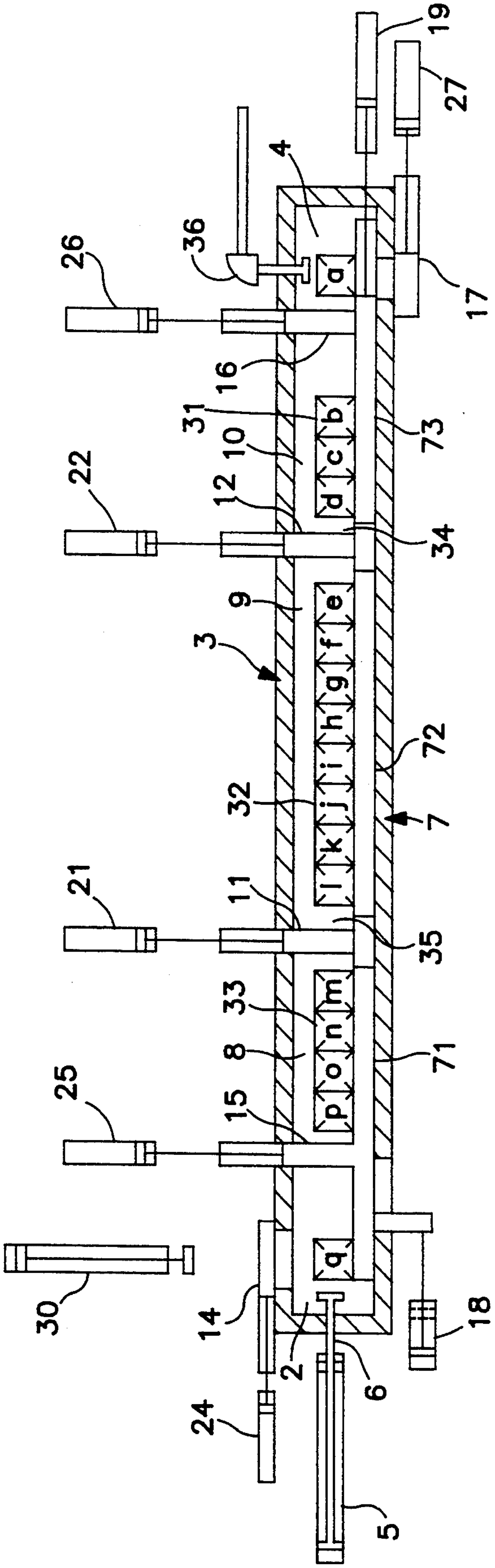

Referring first to FIG. 1, the schematic shows a pusher type furnace with a furnace casing 1 surrounding an entry chamber 2, a heat treatment chamber 3 and an exit chamber 4 arranged in the aforementioned sequence in the direction of charge travel. The adjoining rectilinear charge holding devices or trays a through p or q are pushed through said furnace using a pusher device 5 with a pusher rod assembly 6 entering the furnace chamber 1 through a substantially gas-tight arrangement and operating into the entry chamber 2.

To carry the charge holding devices a through q inside the furnace casing 1, a carrier system 7 is provided, said carrier system consisting in the case of the embodiment of the present invention herein described of three skid sections 71, 72 and 73 arranged behind each other substantially in one plane. The skid section 71 facing the furnace entry end and the skid section 73 facing the furnace exit end are movable in the direction in which said pusher device 5 operates whereas the central skid section 72 is stationary. The heat treatment chamber 3 may be partitioned into three chambers sections 8, 9 and 10 by doors 11 and 12. In a pusher type furnace for gas carburizing, the first chamber section is used for heating the charges carried by the charge holding devices, the second (main) chamber section 9 is used for carburizing and for diffusion and the third chamber section 10 is used for diffusion and for lowering charge temperature to hardening temperature.

In addition to doors 11 and 12, the pusher type furnace described herein is like conventional furnaces provided with two entry area doors 14 and 15 to isolate an entry chamber 2 and two exit area doors 16 and 17 to isolate an exit chamber 4. It is important to note that door 14 at the furnace inlet shown in the top part of FIG. 1 and door 17 at the furnace outlet shown in the bottom part of FIG. 1 are actually arranged in the side walls of the furnace casing 1 for transferring charge holding devices at the appropriate level of the charge carrying system 7 into the furnace entry chamber 2 and out of the furnace exit chamber 4.

The doors 11, 12 and 14 through 17 are equipped with associated door actuating devices 21, 22 and 24 through 27 which may be of conventional design. Charging device 30 is used to transfer a new charge holding device q in FIG. 1 A into the furnace entry chamber 2 after opening inlet door 14 and discharging device 36 which is a pusher in the embodiment of the present invention described herein is used to remove a charge holding device with its associated charge from the exit chamber 4 with door 17 being open.

Each movable skid section 71 and 73 is provided with a piston type cylinder device 18 and 19 respectively movable in the direction of pusher operation. The travel of cylinder device 18 between the end position E (retracted) and the end position A (extended) is dimensioned to allow the movement of skid section 71 in the direction of pusher operation by the length of one charge holding device or tray. In addition to the two end position A and E designating again the extended and the retracted piston positions, the downstream cylinder device 19 may be moved into an intermediate position M, the entire travel being dimensioned for the downstream skid section 73 to be moved in the direction of pusher operation by three times the charge holding device or tray length. Said intermediate position M is spaced one third of the full cylinder travel away from the final position A and two thirds of the full cylinder travel away from a final position E.

The operation of the embodiment of the pusher type furnace divulged herein as charge holding devices a through q are moved forward by one length will now be described by reference to FIGS. 1 A through 1 E showing the different parts of one furnace cycle. FIG. 1 A shows the pusher type gas carburizing furnace in a part of the furnace cycle in which all doors 11, 12 and 14 through 17 are closed. The charge temperature in chamber section 10 holding a set of charge holding devices 31 consisting of trays a through d is being lowered to the temperature required for hardening the parts first heat-treated. Simultaneously, the parts carried by trays e through l forming part of a central set of charge holding devices 32 are being heat-treated in the carburizing zone 9 and parts carried by trays m through p of a further set of charge holding devices 33 are being heated in section 8 of furnace chamber 3. The pusher device 5 is in its fully retracted end position and the movable skid section 71 is in its left end position in which cylinder device 18 is in its retracted position E (the positions of mobile furnace parts being shown in black in FIG. 1).

Following the completion of the heat treatment of the charge carried by tray a, doors 14 and 16 are opened in a first part of the furnace cycle and actuator 19 is thereafter moved from its intermediate position M into the fully retracted position E thereby moving the third skid section 73 forward in the direction of pusher operation (from left to right in FIG. 1) by the length of two trays. As depicted in FIG. 1 B, front tray a has been transferred into the exit chamber 4 after the completion of said forward movement. Said tray a may then be moved out of said exit chamber 4 by discharging device 36 when door 17 has been opened by actuating device 27. Simultaneously with the transfer of tray a into the exit chamber 4 by the forward movement of skid section 73, charging device 30 moves forward and pushes tray q into the entry chamber 2. The main pusher 5 and actuator 18 remain inoperative during this part of the furnace cycle.

FIG. 1 C depicts the next following part of the furnace cycle during which charging device 30 is retracted and skid section 73 is simultaneously moved by a length of two trays in a direction opposite to the direction of pusher operation, actuator 19 returning to the intermediate position M in which it was at the beginning of the furnace cycle as depicted in FIG. 1 A. As afore described, front tray a was prior to the aforementioned movement discharged from the exit chamber 4. Alternatively, said tray a may simply have been removed laterally off skid pair 73. In the part of the furnace cycle depicted in FIG. 1 C, section 10 of the heat treatment chamber only holds trays b through d, while the station previously occupied by tray a is unoccupied. A new tray q is in the entry chamber 2 and doors 14 and 16 are closed again.

In the next following part of the furnace cycle shown in FIG. 1 D, doors 15, 11 and 12 are first opened through the operation of door actuating devices 25, 21 and 22, thereby creating an unrestricted passage from the entry chamber 2 through the heat treatment chamber 3 allowing the forward movement of trays b through q. Following the opening of doors 11 and 12, actuators 18 and 19 are moved into the extended positions A depicted in FIG. 1 D, thereby moving the mobile skid sections 71 and 73 by one tray length towards the stationary central skid section 72. Said relative movements of said skid sections 71 and 73 close the gaps 34 and 35 previously separating tray set 31 from tray set 32 and tray set 32 from tray set 33 as shown in FIG. 1 C and all trays b through p in heat treatment chamber 3 are joined again in one uninterrupted row.

In the next following part of the furnace cycle shown in FIG. 1 E, the pusher device 5 moves into position A and the pusher head 50 first moves tray q in the entry chamber 2 forward into a position adjacent to the last tray of the set of charge holding devices 33 and thereafter moves all trays b through q forward by one tray station in the direction of pusher operation X.

In the next following part of the furnace cycle depicted FIG. 1 F the trays positioned adjacent to each other following the forward movement of pusher device 5 must again be separated into three sets of charge holding devices 31 through 33 to create the gaps 35 and 34 needed for doors 11 and 12 to close and for the heat treatment to continue in the isolated heat treatment chamber sections 8, 9 and 10. To obtain a foresaid separation, actuator 18 is moved into its retracted position E thereby moving skid section 71 by one tray length to the left and actuator 19 is moved into its intermediate position M thereby moving skid section 73 by one tray length to the right in the direction of pusher operation. The operations hereinbefore described create gaps 34 and 35 allowing doors 11 and 12 to close to separate the heat treatment chamber 3 into isolated chamber sections 8, 9 and 10. The closing of doors 11 and 12 by the operation of the door actuating devices 21 and 22 and the closing of door 15 at the outlet of furnace entry chamber 2 completes the furnace cycle and the gas carburizing furnace is in the initial position of FIG. 1 A (with each charge holding device or tray having moved by one station to the right, front tray a having been discharged and a new (last) tray q having entered heat treatment chamber 8.

The separation of the charge carrier system 7 into three skid sections 71, 72 and 73 with two sections being mobile in the direction of pusher operation X as described hereinbefore allows the charge holding device system to be split into three sets of charge holding devices 31, 32 and 33 and the heat treatment of the parts carried by the charge holding devices of each such set in three isolated chamber sections 8 through 10. The afore described arrangement allows in turn the easy separation of the heat treatment chamber 3 into three zones 8 through 10 for temperature and atmosphere control, heat transfer and atmosphere exchange between said zones being practically avoided.

The afore described separation of the furnace chamber 3 into chamber sections isolated by doors may if desired be reduced to the separation of said chamber into two sections separated by one door or be refined into the separation of said chamber into more than three sections separated by more than two doors. Irrespective of the exact arrangement, though, skid section 73 facing the discharge end of the furnace will always have to be mobile because following the joining of all charge holding devices (see FIG. 1 D) and the forward movement by one tray station skid section 73 is needed to create gap 34 separating tray set 31 from the remaining trays. Skid section 73 is also necessary for removing front tray a or b from the furnace. If heat treatment chamber 3 is separated by one door only (door 12), the mobile upstream skid section with its associated drive is unnecessary as pusher device 5 can be used both to push in the new tray q and to push forward all trays by one tray station.

In lieu of the mobile arrangement of the upstream skid section, skid section 72 which is stationary in the embodiment of the present invention described in detail hereinabove may be displaceable to create gap 35 for closing door 11. The invention also allows the operation of parallel tracks in heat treatment chamber 3 or the provision of more than two doors for partitioning heat treatment chamber 3 with a number of mobile skid sections equal to the number of gaps to be created between the various sets of charge holding devices.

Skid sections 71 through 73 of carrier system 7 comprise preferably at least two interconnected rails running in the direction of pusher operation X to create a continuous horizontal surface in the longitudinal direction throughout the entire heat treatment chamber 3, engagement and disengagement at the ends of said rails may be of the toothed type.

Process control is in view of the predetermined furnace cycle depicted in FIGS. 1 A through 1 F preferably by computer to actuate the pusher device 5, doors 11, 12 and 14 through 17 as well as the mobile skid sections 71 and 73 of the charge carrier system 7 at the given points in time during said cycle.

Actuating devices and actuators may partly be coupled because of the partly synchronized cyclic operation of individual actuators and mobile furnace components. FIG. 2 is a schematic showing how the cycle of skid section 71 motion and the cycle of pusher device 5 motion depicted in FIGS. 1 D through 1 E may be coupled.

In the embodiment of the present invention depicted in FIG. 2, no separate cylinder device 18 is used but the actuation of the mobile skid section 71 is derived from the operation of drive 51 of pusher device 5. The pusher rod assembly 6 of said pusher device is provided with a driver 52. Crank 60 hinged at one end 61 features a fork-type end 62. A slot 63 is arranged between the hinged end 61 and the fork-type end 62 of crank 60, said slot being engaged by the pin 75 of linkage 76 coupled with skid section 71. For stability reasons, driver 52 is preferably integrated in a frame-type structure in which two parallel rods 6 are interconnected by cross heads and driver 52 is one of said cross heads, pin 53 being arranged between said parallel rods 6.

Figure 1F:
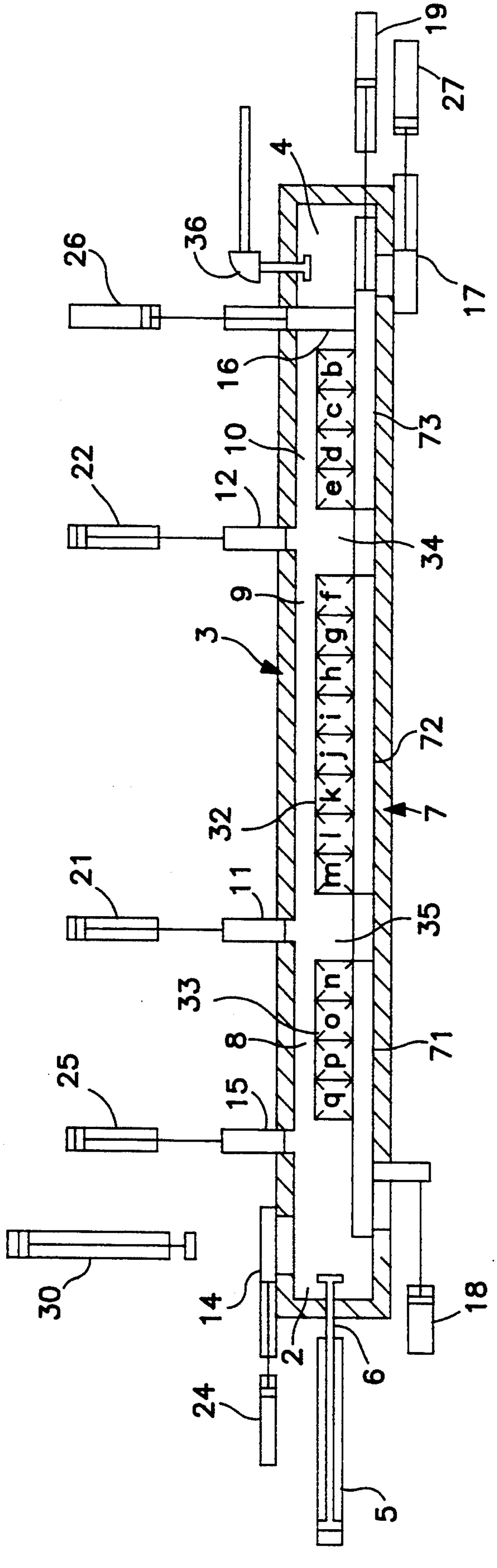

FIG. 2 shows crank 60 during the part of the furnace cycle depicted in FIG. 1F. As actuator 51 is extended, crank 60 is moved by the pin engaging with the fork-type slot 64 at point P1 and turned clockwise. Rod 46 is moved to the right by distance s equal to the length of one tray while rod 6 travels distance t which may, for example, be twice as long. Following said movement skid section 71 connected with rod 76 has reached its final position in the direction of pusher operation X and as the pushing operation of pusher device 5 continues pin 53 is disengaged from slot 74. As pusher device 5 returns into the position depicted in FIG. 1 F, pin 53 enters the slot at the fork-type end 62 of crank 60 at point P2 and crank 60 is thereupon turned anti-clockwise back to its final position P1 shown in FIG. 2. To correctly synchronize crank movement with the movement of pusher rod assembly 6, pin 53 must run reliably in slot 64 between points P1 and P2. At point P2, pin 53 must leave the slot as pusher extension continues and reliably enter said slot as the pusher is being retracted. To improve the reliability of pin motion, the fork-shaped ends 62 around slot 64 may be provided with appropriate spring-loaded catches with steep flanks limiting slot 64 and inclined outer flanks providing a deflecting ramp for the pin.

Other components may likewise be coupled to use drives for the operation of several actuators. Such a synchronization or combination is in particular feasible for actuating devices 21 and 22 as doors 11 and 12 are usually closed and opened simultaneously.

What is claimed is:

1. A pusher type furnace for heat-treating charges carried by charge holding devices, said pusher type furnace having:

an entry chamber;

an exit chamber;

a heat treatment chamber extending between said entry chamber and said exit chamber and comprising substantially rectilinear sections to hold at least one row of such charge holding devices which may be moved in the pusher operating direction;

first door means to separate said heat treatment chamber from said entry chamber;

second door means to separate said heat treatment chamber from said exit chamber;

pusher means for the cyclic transfer of said at least one row of charge holding devices through said heat treatment chamber;

charge holding device carrier means to support said charge holding devices in said heat treatment chamber, said carrier means having at least two sections, each of said sections being adapted to carry at least one of said charge holding devices, at least one of said sections near one end of said heat treatment chamber being adapted to be moved in said pusher operating direction by an actuator coupled to the charge holding device carrier means to create a gap in said row of charge holding devices between two adjacent sections; and third door means to separate said heat treatment chamber into at least two compartments, said third door means being adapted to be inserted into said at least one gap.

2. The pusher type furnace defined in claim 1 wherein each of said compartments of said heat treatment chamber is adapted to hold a set of at least three adjoining charge holding devices.

3. The pusher type furnace defined in claim 2 wherein said heat treatment chamber comprises three compartments and one compartment thereof is associated with a stationary section of said charge carrier means.

4. The pusher type furnace defined in claim 3 further comprising means for coupling the motions of said pusher means and a section of said charge carrier means facing the entry part of said furnace.

5. The pusher type furnace defined in claim 4 wherein said means for coupling the motions of said pusher means and said section comprises a crank, said crank being lodged in a bearing at one end and fork-shaped at the other end, said pusher means engages with said fork-shaped end in one portion of its motion and said section of said carrier means facing said furnace entry end engaging with a central part of said crank.

6. The pusher type furnace defined in claim 1 wherein the arrangement of said heat treatment chamber and said exit chamber is rectilinear.

7. The pusher type furnace defined in claim 6 wherein the arrangement of said entry chamber and said heat treatment chamber is rectilinear.

8. The pusher type furnace defined in claim 7 wherein said exit chamber is provided with means for retaining charge holding devices.

9. The pusher type furnace defined in claim 2 wherein the sections of said carrier means have finger-shaped ends and are arranged with a displacement relative to each other so that the finger-shaped ends of two adjacent sections may engage and disengage with respect to each other.

10. The pusher type furnace defined in claim 9 wherein the sections of said carrier means may be lifted and lowered.

11. The pusher type furnace defined in claim 1 wherein said entry chamber is associated with means for transferring said charge holding devices into said furnace and means are provided to discharge said charge holding devices from said exit chamber.

12. The pusher type furnace defined in claim 11 wherein said exit chamber is provided with means to retain charge holding devices in said chamber.

13. The pusher type furnace defined in claim 2 wherein control means are provided for the actuation of said pusher means, said first, said second and said third door means and said mobile sections of said carrier means at predetermined points in the furnace cycle.

14. The pusher type furnace defined in claim 13 further comprising entry chamber and exit chamber inlet and outlet doors actuated by said control means provided on said entry and exit chambers.

15. In a pusher type furnace comprising a heat treatment chamber through which a row of charge holding devices may be pushed from an inlet to an outlet along a rectilinear direction of charge travel, a method for heat treating charges carried by said charge holding devices, said method comprising the steps of a) entering said charge holding devices into said heat treatment chamber at a first end thereof and pushing said charge holding devices together for said devices to form at least one row and to be in contact with each other in the direction of charge transfer;

b) moving said row of charge holding devices in said direction of charge transfer in tune with an overall furnace cycle each such forward movement continuing until the end of the pusher part of each such cycle;

c) thereafter moving a charge holding carrier means with an actuator coupled to the charge holding carrier means to separate each such row of charge holding devices into at least two sets creating a gap in the direction of charge transfer between each two such sets, whereby at least one of each two adjacent sets is moved relative to the other set by a predetermined distance;

d) separating said heat treatment chamber into compartments by closing a door across each gap between two such adjacent sets;

e) selectively heat-treating the charges held by at least one of said isolated sets of charge holding devices;

f) opening the door across each gap between each two adjacent sets;

g) joining the separated sets of charge holding devices by moving at least one charge holding device carrier means relative to another charge holding device carrier means wherein said one charge holding device carrier means is moved by an actuator coupled to said one charge holding device carrier means and h) carrying out the next following pusher part of the overall furnace cycle to move each row of charge holding devices in said direction of charge travel.

16. The method defined in claim 15 wherein each such row of charge holding devices in said heat treatment chamber is separated into three sets, an upstream set being moved in a direction opposite to said direction of charge travel, a downstream set being moved in said direction of charge travel and a central set remaining stationary.

17. The method defined in claim 16 wherein said downstream set is after closing the upstream door initially moved by a further distance in said direction of charge travel to allow charge holding device discharging.

18. The method defined in claim 15 wherein said row of charge holding devices consists of a series of devices of the same length in said direction of charge travel.

19. The method defined in claim 15 wherein means are provided for charge holding device position registration and the movement of sets of charge holding devices is controlled as a function of the position so registered.

20. A pusher type furnace for heat-treating charges carried by charge holding devices and moved through said furnace in a cyclic mode in a direction of charge travel, said pusher type furnace having a heat treatment chamber to hold at least one row of adjoining charge holding devices;

first door means to close and to open an inlet of said heat treatment chamber;

second door means to open and to close an outlet of said heat treatment chamber;

pusher means for the cyclic transfer of said charge holding devices through said heat treatment chamber;

charge holding device carrier means to support said charge holding devices in said heat treatment chamber, said carrier means having at least three sections arranged substantially one behind the other in said direction of charge travel, the upstream and the downstream sections being adapted to be moved in said direction of charge travel to create a gap in the row of charge holding devices between each two adjacent sections, wherein the upstream section is moved by an actuator coupled to the upstream section and the downstream section is moved by an actuator coupled to the downstream section; and third door means to separate said heat treatment chamber into at least three compartments, said third door means being associated with each such gap and adapted to close across each such gap between each two successive pushing parts of the overall furnace cycle, the heat treatment chamber thereby being selectively dividable into at least three heat treatment zones.

21. The pusher type furnace defined in claim 20 wherein a central section of said charge carrier means is stationary.

22. The pusher type furnace defined in claim 21 wherein each section of said charge holding device carrier means comprises at least two substantially parallel rails running in said direction of charge travel.

23. The pusher type furnace defined in claim 22 wherein said sections of said carrier means have combshaped ends engaging with each other at least as said gaps are being closed.

24. The pusher type furnace defined in claim 23 wherein the mobile sections of said carrier means may be moved both in the direction of charge travel to create and to close said gaps and in a substantially vertical direction to lift and to lower said charge holding devices.

25. The pusher type furnace defined in claim 21 wherein the motions of said pusher means and said upstream section of said carrier means are coupled.

26. The pusher type furnace defined in claim 25 wherein said means for coupling the motions of said pusher means and said upstream section comprises a crank, said crank being lodged in a bearing at one end and fork-shaped at the other end, said pusher means engages with said fork-shaped end in one portion of its motion and said upstream section of said carrier means engages with a central part of said crank.

27. The pusher type furnace defined in claim 21 further comprising an exit chamber arranged downstream from said heat treatment chamber in said direction of charge travel.

28. The pusher type furnace defined in claim 26 further comprising an entry chamber arranged upstream from said heat treatment chamber along the same center line.

29. The pusher type furnace defined in claim 27 wherein said exit chamber is provided with means to retain charge holding devices in said chamber.

30. The pusher type furnace defined in claim 26 further comprising an exit chamber downstream from said heat treatment chamber.

31. The pusher type furnace defined in claim 28 further comprising control means for the actuation of said pusher means, said door means and said movable sections of said heat treatment chamber carrier means at predetermined points of the overall furnace cycle.

32. The pusher type furnace defined in claim 31 wherein said entry chamber and said exit chamber are provided with inlet and outlet doors controlled by said control means.

* * * * *